(12) United States Patent
Trinkel et al.

(10) Patent No.: US 9,987,803 B2
(45) Date of Patent: Jun. 5, 2018

(54) METHOD AND SYSTEM FOR FABRICATING A PRODUCT USING A DIGITAL FABRICATION UNIT

(71) Applicant: DEUTSCHE TELEKOM AG, Bonn (DE)

(72) Inventors: Marian Trinkel, Kreuzau OT Untermaubach (DE); Jens-Oliver Haupt, Sankt Augustin (DE); Frank Lamack, Dresden (DE)

(73) Assignee: DEUTSCHE TELEKOM AG, Bonn (DE)

( * ) Notice: Subject to any disclaimer, the term of this patent is extended or adjusted under 35 U.S.C. 154(b) by 299 days.

(21) Appl. No.: 14/892,579

(22) PCT Filed: Sep. 30, 2013

(86) PCT No.: PCT/EP2013/002927
§ 371 (c)(1),
(2) Date: Nov. 20, 2015

(87) PCT Pub. No.: WO2014/202104
PCT Pub. Date: Dec. 24, 2014

(65) Prior Publication Data
US 2016/0096333 A1   Apr. 7, 2016

(30) Foreign Application Priority Data

Jun. 21, 2013   (DE) .................... 10 2013 010 366

(51) Int. Cl.
*B29C 67/00* (2017.01)
*G05B 19/4099* (2006.01)
(Continued)

(52) U.S. Cl.
CPC ........ *B29C 67/0088* (2013.01); *B29C 64/386* (2017.08); *G05B 19/4099* (2013.01);
(Continued)

(58) Field of Classification Search
CPC . B29C 67/0088; B33Y 50/02; G05B 19/4099; G05B 2219/35134;
(Continued)

(56) References Cited

U.S. PATENT DOCUMENTS 6,023,269 A * 2/2000 Matsuo ................. G06F 19/321
715/748
7,656,402 B2   2/2010 Abraham et al.
(Continued)

FOREIGN PATENT DOCUMENTS

JP   2002007851 A   1/2002
JP   2003141179 A   5/2003
(Continued)

OTHER PUBLICATIONS

Jerry. Fuh, et al., "Advances in collaborative CAS: the-state-of-the art", Computer-Aided Design 37, Dec. 2005. pp. 571-581.
(Continued)

*Primary Examiner* — Yuhui R Pan
(74) *Attorney, Agent, or Firm* — Leydig, Voit & Mayer, Ltd.

(57) ABSTRACT

A method for producing a product using a digital fabrication unit, in which a service for producing the product is started via a communication network via a communication device connected to the communication network, and the product is manufactured using the digital fabrication unit based on data describing production of the product made available to the fabrication unit.

10 Claims, 2 Drawing Sheets

(51) Int. Cl.
- *G06Q 50/04* (2012.01)
- *G06Q 10/10* (2012.01)
- *B29C 64/386* (2017.01)
- *B33Y 50/02* (2015.01)

(52) U.S. Cl.
CPC ............ *G06Q 10/10* (2013.01); *G06Q 50/04* (2013.01); *B33Y 50/02* (2014.12); *G05B 2219/35134* (2013.01); *G05B 2219/49007* (2013.01); *Y02P 90/30* (2015.11)

(58) Field of Classification Search
CPC ......... G05B 2219/49007; G06Q 10/10; G06Q 50/04; Y02P 90/30
See application file for complete search history.

(56) References Cited

U.S. PATENT DOCUMENTS

| | | | |
|---|---|---|---|
| 2007/0050070 A1 | 3/2007 | Strain et al. | |
| 2007/0209054 A1* | 9/2007 | Cassanova | G06Q 10/10 |
| | | | 725/100 |
| 2008/0111816 A1* | 5/2008 | Abraham | G06Q 30/06 |
| | | | 345/420 |
| 2011/0313878 A1 | 12/2011 | Norman | |
| 2013/0132432 A1* | 5/2013 | Carter | G06F 17/50 |
| | | | 707/770 |

FOREIGN PATENT DOCUMENTS

| | | |
|---|---|---|
| JP | 2005352633 A | 12/2005 |
| RU | 2008104411 A | 9/2009 |
| WO | WO 2007017738 A2 | 2/2007 |

OTHER PUBLICATIONS

Anonym: "Digital Fabricator", Wikipedia, der freien Enyklopädie, Apr. 4, 2013 (Apr. 4, 2013), XP002720284, Retrieved from the Internet: URL:http://de.wikipedia.org/w/index.php?title=Digital_Fabricator&oldid=116990453 [retrieved on Feb. 13, 2014] the whole document.

* cited by examiner

{Supplementary information 1/2}.
{Supplementary information on max. 2 pages}.

Creation of rights.

Fig. 2

METHOD AND SYSTEM FOR FABRICATING A PRODUCT USING A DIGITAL FABRICATION UNIT

CROSS-REFERENCE TO RELATED APPLICATIONS

This application is a U.S. National Phase application under 35 U.S.C. § 371 of International Application No. PCT/EP2013/002927, filed on Sep. 30, 2013, and claims benefit to German Patent Application No. DE 10 2013 010 366.5, filed on Jun. 21, 2013. The International Application was published in German on Dec. 24, 2014 as WO 2014/202104 A1 under PCT Article 21(2).

FIELD

The invention relates to a method for producing a product using a digital fabrication unit, in which a service for producing the product is started via a communication network using a communication device connected to the network, and the product is manufactured using a digital fabrication unit on the basis of the data describing the product production, which are made available to the fabrication unit.

BACKGROUND

Fabrication units are known in the prior art and are frequently used for producing three-dimensional products for example, such as prototypes or replacement parts. In this case, a distinction is basically made between fabricators which operate by subtraction, by means of which material is removed from a material stock, for example a block full of material, in order to thus produce the product, for example machining, and fabricators which operate by addition, which are often also known as 3D-printers and have the advantage compared with the fabricators initially mentioned that no, or substantially no, material waste occurs when producing a product.

The operating principle of 3D-printers of this kind is essentially based on producing a product in layers by means of physical or chemical curing or melting processes, plastics materials, synthetic resins, ceramics or metals being used as typical materials.

In the context of the disclosure, the term "fabrication unit" includes both fabrication units operating three-dimensionally and, optionally, also such units which operate merely two-dimensionally. A fabrication unit also refers to systems and/or machines which process data, in particular CAD data, in particular in the field of use of Industry 4.0 (the Internet of Things).

In this case, the production basically functions such that, based on a required product, the data describing the product production, for example CAD data, are provided to the fabrication unit or to a unit controlling said fabrication unit, in order to then carry out the manufacture on the basis of these data. In this case, it can optionally be provided for the data describing the product production to be directly capable of activating a fabrication unit, or else for said data describing the product production to first require processing in order to then carry out the product production using the processed data.

Since fabrication units of the type mentioned at the outset are comparatively expensive devices, it has further become common in the prior art for companies to make available their fabrication units for producing products required in customer orders and to make said units available to the customers after the production.

For this purpose, it is provided for a customer interested in producing a product to provide the necessary data describing the product production, i.e. CAD data for example, to a service provider offering to produce a product using a fabricator, and for the service provider to accordingly use said provided data in order to produce the product on the basis of said data.

Typical CAD file formats used in this context are what are known as STL files (surface tessellation language) or VRML files (virtual reality modelling language) or vector files.

In particular in the case of complex products, the files to be sent may accordingly have a significant file size, with the result that, in the prior art, problems thus result from the fact that it takes a long time to upload a file describing the product production, for example a CAD file of the aforementioned type, in particular when it is taken into account that, although many telecommunications providers offer very high download speeds in their Internet data tariffs, the upload speeds are often many times lower.

Service providers wishing accordingly to offer to manufacture products for customer orders on their own fabrication units therefore often face a problem due to the bandwidth available for transmission, in particular when several customers wish to transfer data simultaneously.

In addition, business models are known in the prior art according to which a service provider offers to commission the production of products on its at least one fabrication unit, which products are already stored by the service provider and were originally uploaded by other customers for example and made available for publication. In this case, a customer can usually select a required product from a data catalogue containing a large number of products, which selected product is then manufactured, to order, for the customer.

In this case, it has been found to be problematic that although, if interested, the customers can order precisely the product represented in the data catalogue, this does not permit the product to be individualised according to the wishes of the customer.

According to the current prior art, individualisation of this kind would require that the data in question which describe the product production first have to be transferred from the service provider to customers in order for the customer to make its own modifications to these data, and to send the modified data describing the product production back to the service provider.

As a result, data transport of a significant amount of data is required both for downloading to the customer and for uploading by the customer, which is currently almost impossible on account of the bandwidth restrictions of internet connections, in particular when a service of this kind is used by a number of customers at once.

SUMMARY

In an embodiment, the invention provides a method for producing a product using a digital fabrication unit, in which a service for producing the product is started via a communication network via a communication device connected to the communication network, and the product is manufactured using the digital fabrication unit based on data describing production of the product made available to the fabrication unit. The method includes: providing at least one data catalogue containing a plurality of products available for production in a database within the communication network, at least one data record comprising data describing product production being associated with each product of the plurality of products; displaying at least one product from a subset of all the products available for production on a display unit of the communication device based on a piece of information associated with the communication device, wherein the piece of information is a network identifier or a device identifier of the communication device or a locality; forming the subset based on the information associated with the communication device; displaying the at least one product selected from the subset using data describing product visualisation, wherein the data describing product visualization are transmitted via the communication network from a fabrication server to the communication device and have a smaller data volume than stored data describing product production; sending data describing production of a modification to at least one selected product are sent from the communication device to the fabrication server; combining data stored in the database describing product production of the at least one product and the data describing the production of the modification to form overall data describing production of the modified product; and producing the modified product using a fabrication unit based on the combined overall data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the invention provides a method and a system which overcomes the technical problems associated with the data transport and which permits individualisation for a customer, i.e. the possibility of modifying, according to customer wishes, a product to be produced from a catalogue.

In an embodiment, the invention ensures that restrictions are taken into account when producing a required product, which restrictions result for example from technical or from legal or local conditions.

In an embodiment, products which a customer is not permitted to have produced for technical or legal or local reasons, or of which the production is not appropriate for the customer concerned in the present case, are not offered to the customer from the outset, in order to thereby save transmission bandwidth.

In an embodiment, a data catalogue containing a plurality of products available for production is provided in a database within the communication network, at least one data record comprising data describing the product production being associated with each product.

This ensures that a service provider can make available a plurality of products from which a customer can select via a telecommunications network via its own communication device, in order to then commission the service provider to produce a selected product from the data catalogue for production.

A further significant aspect of the method according to the invention is that at least one product from a subset or an entire subset of all the products available for production is displayed, in particular for selection, on a display unit of the communication device, on the basis of a piece of information associated with the communication device, in particular on the basis of an identifier, such as a network identifier or a device identifier of the communication device, or else a piece of local information (locality) about the local position of the communication device or the customer. In this case it is also provided according to the invention for the subset to be formed on the basis of the information associated with the communication device, that is to say for example an identifier or a locality.

This aspect according to the invention achieves here that, when using its communication device, a potential customer is not offered all the products from the service provider's catalogue in order to select therefrom a product for individual production, but rather that a subset is first formed from the large number of all the products, on the basis of the information associated with the communication device. This subset is displayed completely or in part, so that selection of a product can be made from this subset only.

In order to form the subset it is provided, for example, for the associated information to be made available in a communication step, via the network, from the customer's communication device to the service, in particular to a server, e.g. a fabrication server in the telecommunications network on which the service is running.

In this case it can be provided, for example, for a subset to be formed which takes account of legal restrictions, specifically, for example that certain products in the data catalogue offered are only available for production for customers from a particular local region, for example from one or more specific countries. This may be due, for example, to the fact that certain products are protected by industrial property rights in some countries, whereas in other countries these products are not subject to property rights, with the result that, without the permission of the property rights holder in the countries subject to property rights, the provider is not permitted to produce and offer these products in said countries.

It can therefore be provided according to the method that the local region, in particular the country from which the customer request is made to the service provider, is determined from one of the pieces of information associated with the communication device, for example from a device identifier, a network identifier, a SIM card number or other similar identifier, in order to then form the subset from the set of all available products on the basis of this information, i.e. in particular the locality of the customer. It can accordingly be provided that only this subset is displayed to the customer for selection.

In this embodiment, the associated information therefore does not itself directly form a piece of location information, but rather a piece of local information can be indirectly determined/formed from the associated information.

It is also possible for the associated information to itself directly represent a piece of local information/a locality, in particular one which is specifically measured for the communication device, optionally by the communication device. Here, "locality" means in general the location in which the system, in particular the communication device, the customer, the machine, is situated.

In the prior art, the locality determination—also location determination, position determination—is made for example in accordance with ISO 19762-5, ISO/IEC 19762-5:2008. However, this can also be determined in an inventive manner using further and other technical parameters, i.e. thus, by way of example, overall via a direct, immediate locality determination and/or an indirect locality determination.

Direct locality determination is carried out in particular using global positioning systems (GPS), in particular NAVSTAR GPS, GLONASS, Galileo, COMPASS.

Indirect locality determination is carried out in particular by associating identifiers with localities, in particular by linking customer number, biometric data, CLI, HLR, IP address, network identifier, network address, WLAN identifier, WLAN name, WLAN router identifier, DHCP server identifier, mobile network identifier, device identifier, to the actual and/or possible, presumed locality.

It can thus be possible, for example, for each mobile communications subscriber and/or each communication device to be identifiable by the unique mobile communications identifier, the international mobile subscriber identity (IMSI), and for the locality to be indirectly determinable. In particular, the number is not known to the subscriber and is composed, for example, of the temporary mobile subscriber identity (TMSI), the location area identifier (LAI), the mobile network code (MNC), the location area code (LAC).

The location area—the location region of a mobile station—consists of the service region of one or more base stations and is entered in the visitor location register (VLR). If the subscriber remains within the region, in particular no location update is made, but if the subscriber changes region, an entry is made.

A further identifier for determining the locality is, by way of example, the location area identifier (LAI) and is used by the base station in order to identify the region and consists in particular of the country, network and region identification number.

The mobile country code (MCC), which is a further identifier and is, by way of example, "262" for Germany, makes possible a national, technical locality determination of a communication device, in particular by querying whether the parameter is MCC=262 or whether it is equal to another known country identification number, as a result of which an association with the country, the location, is made.

The location area code (LAC) indicates the region identification number which indicates the exact location region within the service area of an exchange.

The home location area is the service area of a home location register, which is usually the public network as a whole, it being possible to run a plurality of home location registers, in particular in the event of high numbers of subscribers per exchange.

The GSM service area is the region in which the mobile subscriber can be reached without it being necessary to know the current location. In this case, in particular, GSM networks and countries are combined, between which a roaming agreement exists.

The identifiers listed here for example can be used directly, but at least indirectly, to determine the locality. For example, the identifier can be linked to country information in a matrix.

Furthermore, it can be provided in an embodiment that the subset is formed from the set of all the products, on the basis of an identifier assigned in the requesting communication device, it order to thus for example obtain a technical restriction in the product subset to be formed.

If, for example, a customer makes a request to the service, using its mobile telephone as a communication device, to have a protective covering produced, for a customer order, for precisely this telecommunications device, it can be provided for the make of or the software used by the customer's mobile telephone to be determined from the information associated with the communication device, for example a device identifier, serial number or other identifier, in order to then make available, from all the products available, those products, for example protective coverings, which are compatible with this particular telecommunications device.

Furthermore, an identifier also means, for example, at least one device identifier and/or communication identifier, in particular CLI, HLR, IP address, in particular each mobile communications subscriber being identifiable by the international mobile subscriber identify (IMSI), in particular which is usually not known to the subscriber and is composed, by way of example, of the temporary mobile subscriber identity (TMSI), the location area identifier (LAI), the mobile network code (MNC), the location area code (LAC).

Thus, advantageously the locality can also be made indirectly or directly available or calculable using an identifier of this kind.

A subscriber identity module, i.e. a SIM card, can also be used to determine the locality and/or as an identifier, in particular in conjunction with at least one communications device in a machine, a 3D-printer or for systems of Industry 4.0, the Internet of Things.

The subscriber identity module (SIM) is a chip card (smart card) and/or software module and/or at least one part of a virtual machine which stores data necessary for subscriber identification, in particular providing the advantage that one user can use a plurality of terminal devices, e.g. a mobile telephone and a car telephone. Permanent data and safety procedures, as well as temporary data, are stored on the SIM.

Permanent data are, for example, the personal identification number (PIN) and international mobile subscriber identity (IMSI).

Temporary data are, for example, the temporary mobile subscriber identity (TMSI) and location area identifier (LAI).

The home location register (HLR) is a central database in the network and takes over the administrative functions. Each connection set-up is handled via the HLR. The database contains both semi-permanent and temporary data, and contains for example semi-permanent data such as the mobile subscriber international ISDN number (MSISDN), which is a globally unique 15-digit telephone number comprising the country code (CC), the country identification number for Germany being 49 for example. This information/identifier can also be used technically in order to determine the national legal territory and/or a locality by querying and processing the code. A further identifier forms the national destination code (NDC), which is the identification number for the registered network in the country, by way of example 171 for the D1 network or 172 for the D2 network.

Temporary data can also be provided, for example, by the mobile subscriber roaming number (MSRN), which contains the transfer or location number, the identification number of the country, of the network and of the associated exchange of the current location (location area), as well as the local mobile station identity (LMSI), which can also function as the identification number for a more rapid search of HLR data. By way of example, said roaming number is assigned by the VLR.

There may thus for example also be a plurality of HLRs, which are assigned to one or more exchanges, operating and maintenance subsystems for example.

The identifier also means the visitor location register (VLR), which is a local database for example, in which the data required for management are temporarily stored so as to be able to guarantee an efficient connection set-up. The VLR contains copies of data from the HLR, but also specific data.

Further temporary data are, for example, the MSISDN (mobile subscriber international ISDN number), IMSI (international mobile subscriber identity), MSRN (mobile subscriber roaming number), LMSI (local mobile station identity), registered service profile, or specific data, TMSI (temporary mobile subscriber identity), LAI (location area identifier), CKSN (ciphering key sequence number).

The GSM terminal devices for example are registered in the equipment identity register (EIR) by the device identifier IMEI (international mobile station equipment). The system can be advantageously identified thereby. In the process, details about systems and terminal devices can be collected in various lists, files and cloud storage and passed on to the system and/or the network operator. There are thus, for example, white lists, i.e. permitted terminal devices, grey lists, i.e. faulty terminal devices, and black lists, i.e. stolen or technically defective devices.

All identifiers, in particular device identifiers, can be used to identify and/or delimit the locality and/or the national legal territory for example, by querying, determining and processing the specific code in each case, and thereby saving on overall bandwidth.

The formation of a subset from the plurality of all available products is not restricted to the abovementioned examples, but rather other criteria can also arise, according to which subsets are formed from the set of all the products on the basis of the information associated with the communication device in order to display only this subset to the customer for selection, and thus already achieve a reduction in data volume.

Furthermore, it is provided according to the invention to select from the subset of products a product for customer-specific production, and to display the product for example on the requesting customer's telecommunications device using data which describe the product visualisation, these data describing the product visualisation being transmitted via the communication network from a server, for example a fabrication server or a virtual server, to the communication device, and which contain a smaller data volume than the data stored for product production.

When carrying out the method, a distinction is made between at least two different types of data, specifically that there are, on the one hand, data which describe the product production and, on the other hand, data which merely describe how the product is visualised on the requesting customer's communication device, in order for said customer to get an idea of the product to be ordered. The data used for the visualisation has a smaller data volume than the data required for the production, so that this measure according to the invention also reduces the data volume which must be transferred between the requesting customer and the service provider.

According to the invention, the customer has the option of modifying, in a customer-specific manner, the product to be produced. It can be provided here, for example, that a customer may wish to individualise the product in a manner related to the customer as a person, or may desire another form of individualisation which meets the customer's specific requirements. It is then provided, according to the invention, for data to be sent from the communication device, i.e. in particular from the requesting customer's communication device, to the fabrication server, which data describe the production of a modification to the at least one selected product, such that thereafter the data stored in the database and describing the product production of the at least one product and the data describing the production of the modification can be combined within the communication network, i.e. in particular by the fabrication server, to form overall data which describe the production of the modified product, and that the modified product is then produced using a 3D fabrication unit on the basis of the combined overall data.

It is advantageous if the overall data which are required for realising the required customer-specific modification to the catalogue product when producing the modified product are first generated by the service provider, i.e. in the telecommunications network.

It is sufficient to transport between the customer and the service provider the data describing the modification to the product, meaning that these circumstances make it possible to significantly reduce the data volume to be transferred between the customer and the service provider via the telecommunications network.

It can be provided here, according to the invention, that firstly the overall data are formed by combination with the production data of the original products after the data relating to the production of the modification have been transferred within the telecommunications network, in order to then generate a further visualisation from these overall data, for example by calculating the data which describe the visualisation of the modified product, in order to then provide a visualisation of the modified overall product to the customer, in particular prior to a final confirmation of the production commission, and to allow the customer to check whether its modification requirement to the ordered product has also been carried out satisfactorily.

It can generally be provided in the context of the invention for the data describing a product visualisation for each product, in addition to the data describing the product production, to be stored in a database, in particular in the same database. This has the advantage that, in the event of a customer request, the data to be used for the required visualisation can be directly loaded form a database and transferred to the customer in order to display the product on the customer's communication device. This makes it possible to access the data required for the visualisation particularly quickly, but presupposes, conversely, that storage space will be additionally required in order to keep these visualisation data stored in parallel with the production data.

An alternative embodiment can also provide for the data describing a product visualisation to be formed from the data describing a product production, in particular immediately before the data is sent to the communication device for the purpose of visualisation. This embodiment has the advantage that the data required for the visualisation does not have to be kept stored within the telecommunications network, for example in a database, but rather the visualisation data are formed from the production data only when a customer requests the production of a specific product, optionally together with the individual modifications, in order to then transfer said visualisation data to the customer.

The last-mentioned embodiment is advantageous in particular when the customer has, in accordance with the above description, transferred production data for a required modification, i.e. for example CAD data of its modification, to the service provider, said service provider combines the production data for the modification with the production data for the original product, therefore then thereby generates production data for the modified product, and visualisation data are then formed from these production data in order to send said visualisation data to the customer, in particular for the purpose of verification prior to a final order.

A development according to the invention can also provide for the data for producing a modification to a product, which data are transmitted to the fabrication server, to be stored, either separately or, in an embodiment, also together with the data for producing the unmodified product, such that it can be provided here for a modification file to exist in the database, which is assigned to the unmodified product, in particular assigned to the unmodified product data describing the product production.

It can thus be provided, for example, when displaying the products available according to the catalogue and/or the subset formed therefrom, to display both an original product and the types of modifications which other customers have made on the basis of the unmodified product and which are also available for selection, for example when a customer has made these modifications public, in order for these modifications to in turn be used by other customers. It may therefore occur, for example, that a first author designs a product which is available for order in the service provider's catalogue and that, possibly, a number of other customers also make modifications based on this product available at this service provider, so that a customer can commission both the production of the unmodified product and the production of a product already modified by other customers, or in turn further modifies another customer's modification to an original product.

In each of these cases, following selection of a product, i.e. an original product or a product already modified by a customer, merely the data required for the visualisation of this product are transferred to the customer currently making the request, but the data required for producing the products are not transferred in order to thus reduce the data volume and to make better use of the available bandwidth. Since the above procedure may therefore mean that, on the basis of one original product, at least one modification, and possibly a plurality of modifications made by different authors, are available in the service provider's catalogue for production, the invention can provide that, for each product and/or for each modification associated with a product or a product modification, a piece of information, in particular a royalty share, is stored, which provides information about the ratio according to which royalties from a product produced having at least one modification are divided among the authors of the original product and the authors of the at least one modification.

It can be provided here, for example, that the royalty share is determined on the basis of the data volumes of the original product and the at least one modification in particular, the data volumes relating to the data required for production being used in each case. Determination can also be made on the basis of the nodes of vector graphics of the original product and at least one modification.

If a customer accordingly orders a product to which the customer then optionally makes its own modification but which stems from an original product provided with at least one modification made by another customer, a share/a portion of the purchase price to be paid by a current customer to the service provider for ordering said product which has already been modified at least once is to be paid to the author of the original product, and at least a portion to the author or authors who have carried out the previous modifications to the product, provided that the current customer also incorporates these modifications and optionally undertakes its own modification.

Furthermore, ranking information can also be stored as information relating to a product/a modification to the product, for example regarding how many modifications there are and/or the popularity of the product/modification among the customers.

It may be further advantageous here for a piece of information relating to the respective author to be stored for each product and/or for each modification to a product which accordingly thus substantially corresponds to a modified product, said information being formed in particular by a piece of information associated with the author's communication device, in particular a network identifier or device identifier.

It may therefore also be possible, for example, for a customer storing a modification with the service provider so as to be available for purchase by other customers to not need to provide any further details, but rather to remain anonymous for example, and to receive remuneration for its modification, in the event of an order by another customer, merely on the basis of the specific information associated with its telecommunications device, without having to provide any further details.

It can optionally be provided here to additionally provide bank details in order to permit the service provider to accordingly transfer the royalty share owed to this author. It can likewise be provided for the service provider to carry out its own internal account management, and for each customer registered with the service provider to accordingly have an account managed internally there, to which the money corresponding to the respective royalty share is credited in the event of an order by another customer, and the customer can then arrange, at a later time, to withdraw this money from the internally managed account, for example by providing only at this point in time bank details to which this money is to be transferred, or by exchanging its credit, treated as virtual, for products which can be ordered via this service.

In the event of a modification to a product and/or the generation of data for a product, in particular data relating to the production, such as CAD data, a development can also provide for said data to be assigned to a locality, i.e. to a location, by the customer and/or via the customer's communication system or a communications interface, in particular the locality being determined using an identifier, in particular the CLI, HLR, IP address and, within the thus identified locality or a surrounding region defined around said locality, the data are stored in a decentralised manner within the determined locality.

In this case, in a particular type of use, these data can be stored and/or processed in a virtual database and/or virtual machine (cloud, cloud computing), in particular the locality of the virtual database being situated within the legal region of the identifier.

In a further particular use, it can also be provided for the data of a product or the modification thereto, in particular CAD data, vector graphics data, to be detected using a digital camera, in particular a web camera and/or 3D-camera or a 3D-scanner and the stored and/or processed, in particular modified.

The CAD data, vector graphics, in particular the data describing the product production, can be transported in PNG format for example.

In a particular use, the use application, in particular the shop application, is generated for the customer via a virtual machine, in particular is generated and/or processed within the customer's communication system.

In a particular use, the data for visualising the product can be stored in at least one global virtual distributed database, and the data stored for the product production can be stored in a local distributed database. This has the advantage that a low bandwidth is used for the visualisation on the customer's communication device, and at the same time the production data are protected, in particular against data loss.

In a particular embodiment, the data for modifying a product, in particular a modification file comprising data relating to the product production, can remain at the local originating server, a local database, and be called up for production using a reference, in particular a link, in particular the service and/or the method according to the invention can be provided by a server. This has the advantage that the bandwidth is only required at production, and not each time the product is visualised. In this case, the visualisation of the product need not necessarily represent a 1:1 depiction of the product and the production takes place only once the modification has been released by the developer.

An embodiment of the invention will be described in more detail on the basis of the following figures.

Figure 1:
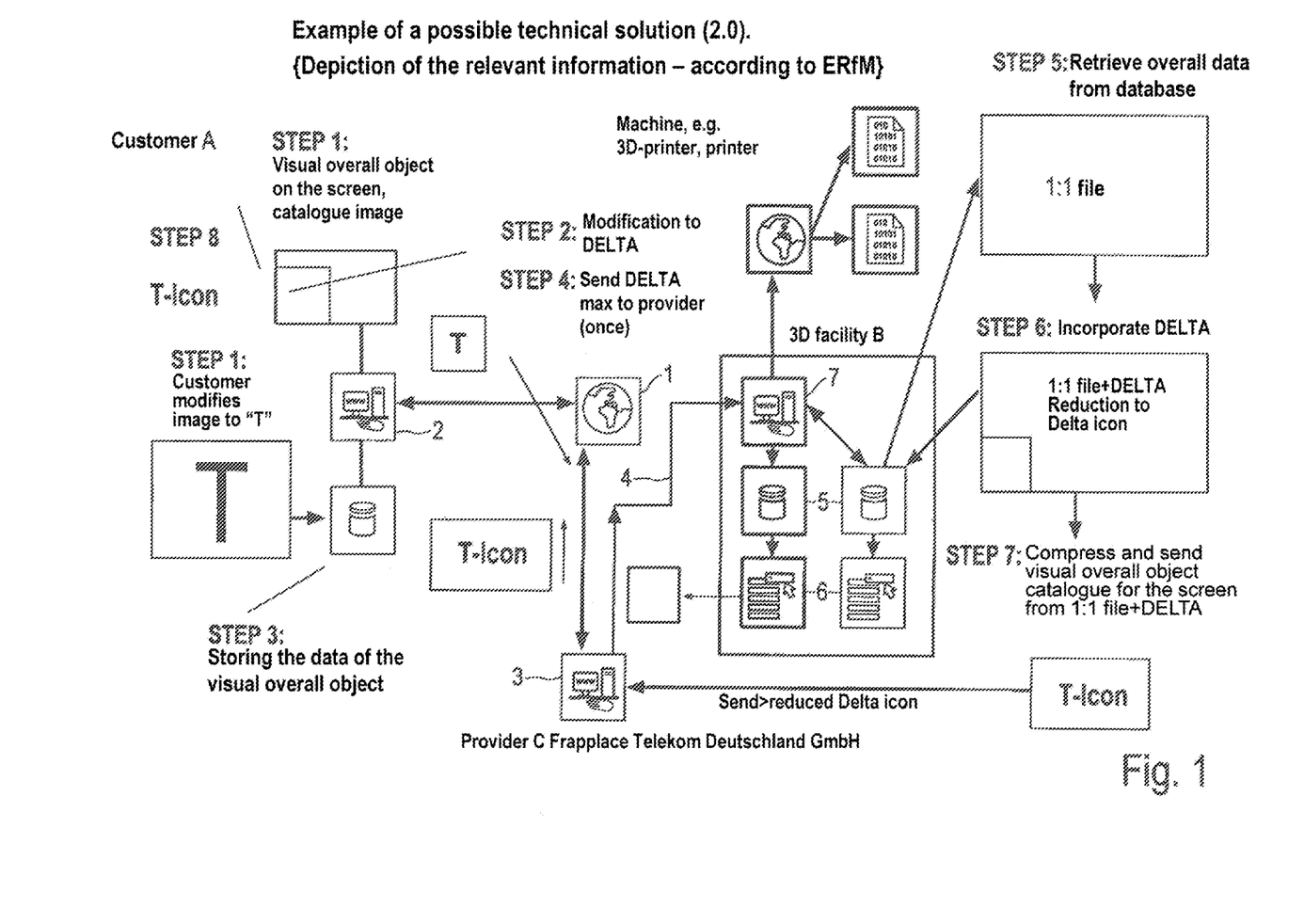
FIG. 1 shows that, for example using the Internet as a communication network 1, a customer can use its communication device 2 to access a fabrication server 3 of a service provider, which server in turn, via a communication connection 4 which likewise takes place via the Internet or an internal network for example, to at least one database 5 in which at least one catalogue 6 of products which can be selected for manufacture is available.

FIG. 1 shows that, for example using the Internet as a communication network 1, a customer can use its communication device 2 to access a fabrication server 3 of a service provider, which server in turn, via a communication connection 4 which likewise takes place via the Internet or an internal network for example, to at least one database 5 in which at least one catalogue 6 of products which can be selected for manufacture is available. In this case, the fabrication server 3 can have direct access to the database 5 via the communication connection 4 for example, or via a server 7 interposed therebetween.

The customer is shown on its communication device 2, for example via the Internet 1, a subset of all the products which it can commission for manufacture, optionally together with a customer-specific modification.

For this purpose, the invention makes use of the fact that each communication device 2 is associated with at least one identifier individual to the device, such as a network identifier under which the communication device participates in communication in the network, or a device identifier which is individual to the device. In relation to telephones, an identifier of this kind may also be specified for example by a CLI or by the HLR (home location register) or VLR (visitors location register) identifiers.

For the purpose of reducing the data volume to be displayed and/or the products to be displayed, it is provided here for a subset to be selected from the catalogue 6 of all available products, on the basis of the information transferred during the communication between the communication device and the fabrication server 3. It can be determined here, for example, that the communication device 2 is located in a specific country, for example Germany, and/or that the owner of the communication device is subject to German legislation, which determination is possible for example on the basis of the network identifier associated with the communication device.

A subset of products which are authorised to be offered for sale and production in Germany can then be formed from the overall catalogue of all available products 6.

Here, the customer can select at least one product, using its communication device 2, upon which said customer is sent visualisation data of the selected product, that is to say those data required for depicting the product on the customer's communication device, for example a computer.

The customer now has the option of making a modification, on its communication device, to the depicted product, and for example to generate CAD data therefor, using a conventional CAD program, in order to describe the production of the required modification using data.

The customer may, for example, also use a file already stored on its computer which as a CAD file describes the production of a required modification. In the present case, the modification is denoted, for example, as the T-ICON of the applicant of the present patent application. As an alternative to the customer producing the modification itself, it can be provided here to make available to the customer modification files from a database of the service provider, which files the customer can use for individual modifications to the product it is to order, and which are accordingly downloaded from the fabrication server 3 to the communication device 2.

It can be provided here, for example, that a customer positions the visualised modifications relative to the original product on the depiction of the product on its telecommunications device, until it reaches a satisfactory result and decides to commission production of the product thus modified.

According to the invention, it is provided here for a customer to send merely the modifications in the form of those data required for the production, i.e. for example a CAD file such as an STL file. Since the production data for the original product are already available at the service provider, it is therefore not necessary to also transfer the original data, but merely the modification data, thus significantly reducing the data volume.

It is therefore provided, according to the invention, for the fabrication server 3 to receive the modification data here via the internet connection described by way of example and itself, or optionally after relaying to a server 7, the modification data for the production of the modification are combined with the production data for producing the original product.

It is then provided to produce the modified product in reality, on the basis of the combined overall data, using a 3D-fabrication unit, and in particular to subsequently send said product to the customer.

FIG. 1 further shows that it can likewise be provided that, from the combined overall data describing the production of the modified product, those data are generated which describe merely the visualisation of the modified product, and that these visualisation data relating to the modified product are transferred to the customer's telecommunications device 2, in particular via the service provider's fabrication server, in order to once again provide the customer with a visualisation of the modified product, in particular prior to an actual commission.

Figure 2:
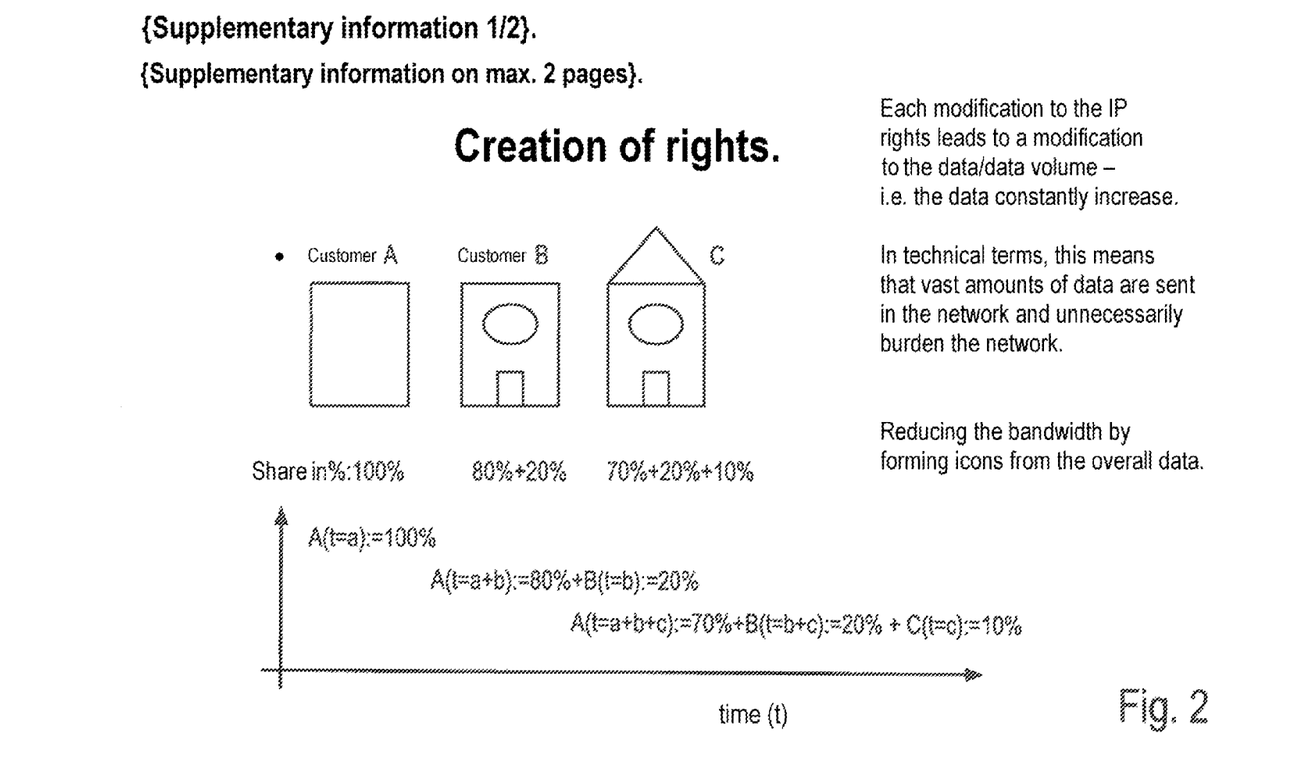
FIG. 2 shows a further embodiment of the procedure according to the invention for capitalising on the royalties relating to the produced products.

FIG. 2 shows a further embodiment of the procedure according to the invention for capitalising on the royalties relating to the produced products. It is assumed here that a customer A has originally saved a product, for example an abstract configuration of a residential building, in the service provider's database for the purpose of sale. A royalty share of 100% can accordingly be stored for this product of customer A, for which there is initially no modification by other customers, meaning that, based on a sales revenue in the event of this unmodified product being ordered by another customer, 100% of the sales revenue, possibly after deduction of the service provider's costs, are paid out to customer A.

The method according to the invention provides that other customers can make modifications to an existing product available in the data catalogue and can in turn store these modifications in the data catalogue in order to also make the modifications publically available for production. FIG. 2 shows that a customer B has made modifications to the original product of customer A, specifically, shown in an abstract manner in this example, a specific house door and window shape for the abstractly depicted house. In this example, with regard to the modification, a royalty share of 80% for customer A and 20% for customer B is stored and/or allocated to this modified product, with the result that, in the event of this modified product being ordered by another customer, 80% of the royalties are paid out to customer A and 20% to customer B. Here, the royalty share can be determined for example in that the proportion of modified data is set in relation to the original data according to the volume of said data.

FIG. 2 further shows that the roof shape of the house is modified by a customer C, meaning that this modified product can again be assigned a modified royalty share for the newly modified product of customer C, specifically, for example, 70% for customer A, 20% for customer B, since its modifications are also present in the product, and 10% for customer C. Here, too, the royalty share can again be determined on the basis of the individual data volume portions which occur due to the respective modifications.

It is also provided here, according to the invention, that in the event of a new customer potentially selecting a modified product, merely the data of this modified product required for the visualisation are transferred from this modified product to the customer here, in order to display this product to the customer on its communication device and to potentially give said customer the option of making modifications, then, here too, the modifications being actually transferred to the service provider in the form of concrete production data, but the production data for the original product and all the modifications already stored being provided directly by the service provider in order to be combined with the individual modifications of the current customer.

It is thus clear that the method according to the invention results in a significant reduction in the data volume to be transferred between a customer and the service provider. A first reduction is achieved in that only a subset of an overall catalogue is displayed, specifically on the basis of a piece of information associated with the communication device, such as a specific identifier or locality/piece of local information, and that furthermore the data volume is reduced in that merely visualisation data, but not production data, for a selected product are transferred to the customer and the customer transmits merely the production data for its individual modifications relating to a modification which may be required to the service provider, but not the production data for the entire modified product. The method and/or a system for carrying out the method thus provides significant advantages, in particular when a service provider offers a large number of products available in the catalogue and thus also has to process a correspondingly large number of requests from potential customers.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing a product using a digital fabrication unit, in which a service for producing the product is started via a communication network via a communication device connected to the communication network, and the product is manufactured using the digital fabrication unit based on data describing production of the product made available to the digital fabrication unit, wherein the method comprises:

providing at least one data catalog containing a plurality of products available for production in a database within the communication network, at least one data record comprising data describing product production being associated with each product of the plurality of products;

displaying at least one product from a subset of all the products available for production on a display unit of the communication device based on a piece of information associated with the communication device, wherein the piece of information is a network identifier or a device identifier of the communication device or a locality;

forming the subset based on the information associated with the communication device;

displaying at least one product selected from the subset using data describing product visualization, wherein the data describing product visualization are transmitted via the communication network from a fabrication server to the communication device and have a smaller data volume than stored data describing product production;

sending data describing production of a modification to the at least one selected product from the communication device to the fabrication server;

combining data stored in the database describing product production of the at least one product and the data describing the production of the modification to form overall data describing production of the modified product; and producing the modified product using the digital fabrication unit based on the combined overall data;

wherein a piece of information is stored for each product and/or for each modification associated with a product or a product modification, wherein the piece of information includes:

a royalty share which provides information about the ratio according to which royalties from a product produced having at least one modification are divided among the author(s) of the original product and the author(s) of the at least one modification; and a ranking relating to a sequence of modifications.

2. The method according to claim 1, wherein data describing a product visualization for each product, in addition to data describing product production, are stored in the database.

3. The method according to claim 1, wherein data for producing a modification to a product are stored together with data for producing the unmodified product in a modification file which is assigned at least to the unmodified product data describing the product production.

4. The method according to claim 1, wherein data describing a product visualization are formed of data which describe an original product with regard to production and/or visualization and at least one modification based thereon with regard to production and/or visualization.

5. The method according to claim 1, wherein the royalty share is determined based on the data volumes of the original product and the at least one modification.

6. The method according to claim 1, wherein a piece of information relating to the author(s) for each product and/or for each modification is stored for each product and/or for each modification, wherein the piece of information is provided or formed by a network identifier or device identifier associated with the communication device of the author(s).

7. The method according to claim 1, wherein the information associated with the communication device for forming a subset is one of the following pieces of information:

country information which is either determined directly for the communication device used or which is derived indirectly from an identifier of the device or identifier used with the device;

a device identifier or communication identifier of the communication device, wherein the device identifier or communication identifier is a calling line identification (CLI), home location register (HLR), visitor location register (VLR), Internet Protocol (IP) address, or an international mobile subscriber identity (IMSI); or the identifier of a subscriber identity module (SIM) card used in the communication device.

8. The method according to claim 1, wherein data describing a product visualization are formed from data describing a product production immediately before the data is sent to the communication device for visualization.

9. The method according to claim 1, wherein the royalty share is determined based on a number of nodes of vector graphics of the original product and the at least one modification.

10. A system, comprising:

a processor; and a non-transitory computer-readable medium having processor-executable instructions stored thereon for producing a product using a digital fabrication unit, in which a service for producing the product is started via a communication network via a communication device connected to the communication network, and the product is manufactured using the digital fabrication unit based on data describing production of the product made available to the digital fabrication unit, wherein the processor-executable instructions, when executed by the processor, facilitate the following:

providing at least one data catalog containing a plurality of products available for production in a database within the communication network, at least one data record comprising data describing product production being associated with each product of the plurality of products;

displaying at least one product from a subset of all the products available for production on a display unit of the communication device based on a piece of information associated with the communication device, wherein the piece of information is a network identifier or a device identifier of the communication device or a locality;

forming the subset based on the information associated with the communication device;

displaying at least one product selected from the subset using data describing product visualization, wherein the data describing product visualization are transmitted via the communication network from a fabrication server to the communication device and have a smaller data volume than stored data describing product production;

sending data describing production of a modification to the at least one selected product from the communication device to the fabrication server;

combining data stored in the database describing product production of the at least one product and the data describing the production of the modification to form overall data describing production of the modified product; and producing the modified product using the digital fabrication unit based on the combined overall data;

wherein a piece of information is stored for each product and/or for each modification associated with a product or a product modification, wherein the piece of information includes:

a royalty share which provides information about the ratio according to which royalties from a product produced having at least one modification are divided among the author(s) of the original product and the author(s) of the at least one modification; and a ranking relating to a sequence of modifications.

* * * * *